(12) United States Patent
Mashiko

(10) Patent No.: US 6,832,107 B2
(45) Date of Patent: *Dec. 14, 2004

(54) PORTABLE INFORMATION EQUIPMENT SYSTEM

(75) Inventor: Koichiro Mashiko, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 09/877,183

(22) Filed: Jun. 11, 2001

(65) Prior Publication Data

US 2001/0029190 A1 Oct. 11, 2001

Related U.S. Application Data

(63) Continuation of application No. 09/198,527, filed on Nov. 24, 1998, now Pat. No. 6,249,690.

(30) Foreign Application Priority Data

Jul. 10, 1998 (JP) .......................................... 10-195576

(51) Int. Cl.⁷ .............................. H04B 1/38; H04B 1/16; H04M 1/00
(52) U.S. Cl. ................. 455/573; 455/343.1; 455/343.6; 455/574; 455/551; 320/106; 320/115
(58) Field of Search ............................... 455/90, 343.1, 455/343.2, 343.3, 343.5, 575.4, 572, 573, 574; 320/106, 114, 115

(56) References Cited

U.S. PATENT DOCUMENTS 5,654,623 A * 8/1997 Shiga et al. ................. 320/106
5,942,877 A * 8/1999 Nishimura ................... 320/112
6,064,804 A * 5/2000 Brink et al. ................... 714/48
6,088,182 A * 7/2000 Taki et al. ..................... 360/71
6,192,236 B1 * 2/2001 Irvin ........................... 455/420
6,202,135 B1 * 3/2001 Kedem et al. ............... 711/162
6,212,410 B1 * 4/2001 Ishida .......................... 455/572
6,317,491 B1 * 11/2001 Chang et al. ........... 379/142.01

FOREIGN PATENT DOCUMENTS

JP 08147222 * 6/1996 ............ H04B/1/38

OTHER PUBLICATIONS

A translation copy of JP 08147222.*

* cited by examiner

Primary Examiner—Simon Nguyen
(74) Attorney, Agent, or Firm—Oblon, Spivak, McClelland, Maier & Neustadt, P.C.

(57) ABSTRACT

A portable information system having an information registration function achieves reduction in manufacturing cost and power consumption. By connecting portable information equipment (1) and a battery charger (10) to be chargeable, signal transmission becomes possible between a micro controller (2) in the portable information equipment (1) and a micro controller (11) in the battery charger (10). Under the control of the micro controllers (2, 11), information management operation is automatically performed during charging. The operation includes backup processing in which personal information stored in a storage portion (3) in the portable information equipment (1) is transferred to a storage portion (12) in the battery charger (10) as backup information, and restore processing in which the backup information stored in the storage portion (12) is transferred to the storage portion (3) as the personal information.

14 Claims, 9 Drawing Sheets

PORTABLE INFORMATION EQUIPMENT SYSTEM

BACKGROUND OF THE INVENTION

1. Field of the Invention

The present invention relates to a portable information equipment system including portable information equipment such as a portable telephone, and a battery charger of the equipment.

2. Background of the Invention

FIG. 8 is a block diagram of the structure of conventional portable information equipment such as a PHS (Personal Handy phone System).

In portable information equipment 53, an antenna 31 transmits and receives a radio wave. The radio wave received from the antenna 31 is transmitted via a switch 32 to a receive group 33 to be subjected to signal processing. The signal processed in the receive group 33 is transmitted to a voice processing portion 34 where the signal goes through voice processing to be a voice signal. Then, a receiver 35 receives the voice signal and emits a voice therefrom.

A microphone 36 receives a voice signal and transmits it to the voice processing portion 34. The voice processing portion 34 performs signal processing of the voice from the microphone 36 and transmits it to a transmit group 37. After performing signal processing of the signal from the voice processing portion 34, the transmit group 37 transmits it as a radio wave via the switch 32 to the antenna 31.

The receive group 33, the transmit group 37, and the voice processing portion 34 are controlled by a circuit control signal SC from a micro controller 40. The micro controller 40, operating on the basis of a clock generated by a crystal oscillator 41, controls a display of a liquid-crystal display portion 42, receives an input from a keyboard 43, or performs the reading and writing from/to a storage portion 44 as well as outputting the circuit control signal SC.

The liquid-crystal display portion 42 displays information, such as an input from the keyboard 43 and received electric field strength. The keyboard 43 receives information input such as a phone number, and the storage portion 44 stores personal information such as a phone number.

A rechargeable battery 45 is an operating power of the portable information equipment 53. As shown in FIG. 9, the battery 45 becomes chargeable by inserting an AC adapter 51 into an electrical outlet 52 to establish electric connections between the AC adapter 51 and the battery charger 50 as well as establishing electric connections between the portable information equipment 53 and the battery charger 50.

The AC adapter 51 converts an ac voltage obtained from the electrical outlet 52 into an appropriate dc voltage and gives it to the battery charger 50. With the dc voltage from the AC adapter 51, the battery charger 50 charges the rechargeable battery 45 in the portable information equipment 53.

The storage portion 44 consists of a high-performance/low-power volatile memory, and a nonvolatile memory that makes no loss of personal information even with insufficient holding power.

As previously described, the portable information equipment, such as a portable telephone, includes a storage portion for storing personal information such as a phone number, an address, and a schedule. This kind of portable information equipment has a built-in rechargeable battery which is charged periodically for operation.

Such portable information equipment, however, carries a risk that the personal information stored in the internal storage portion may be lost, for example when an user leave the rechargeable battery in the equipment uncharged. To prevent this, mostly applied as a memory element for storing the personal information in the portable information equipment has been a nonvolatile memory, such as a flash memory or an EEPROM (Electrically Erasable Programmable Read-Only Memory), that makes no loss of the memory contents even with low or no power voltage.

The nonvolatile memory, however, has the following problems:

(1) Its high manufacturing cost as compared with that of an ordinary volatile memory results in price increase of the portable information equipment;

(2) The use of relatively high write voltage in writing of data (still 5 to 10 V in this semiconductor world where the standard voltage is now about 3.3 V) is an disadvantage for the portable information equipment which requires reduction in power consumption;

(3) If required to include a voltage-transform device driver, the portable information equipment is upsized to be not suitable for portability; and (4) The adoption of a high-voltage battery results in price increase of the portable information equipment.

SUMMARY OF THE INVENTION

A first aspect of the present invention is directed to a portable information equipment system comprising: portable information equipment having a rechargeable battery and operating with the rechargeable battery used as an operating power; and a battery charger capable of charging the rechargeable battery when connected to the portable information equipment in a predetermined condition. The portable information equipment further includes: input means; a storage portion for portable information equipment, storing personal information; and a control portion for portable information equipment, capable of transmitting/receiving information to/from the storage portion for portable information equipment. The battery charger includes: a storage portion for battery charger, storing backup information and an inquiry password; and a control portion for battery charger, capable of transmitting/receiving information to/from the storage portion for battery charger. When the portable information equipment and the battery charger are connected in the predetermined condition, information can be transmitted between the control portion for portable information equipment and the control portion for battery charger, and information management operation is automatically performed between the storage portion for portable information equipment and the storage portion for battery charger, under the control of the control portion for portable information equipment and the control portion for battery charger. The information management operation comprises the steps of: (a) judging whether a password inputted from the input means is consistent with the inquiry password or not; (b) when the password is judged consistent at the step (a) and the personal information has been updated, performing backup processing by transferring the personal information to the storage portion for battery charger as the backup information; and (c) when the password is judged consistent at the step (a), the personal information has not been updated, and the contents of the personal information are inconsistent with the contents of the backup information, performing restore processing by transferring the backup information to the storage portion for portable information equipment as the personal information.

According to a second aspect of the present invention, in the portable information equipment system of the first aspect, the portable information equipment includes the first portable information equipment to the N-th (N≧2) portable information equipment; the rechargeable battery includes the first to the N-th rechargeable batteries; the input means includes the first to the N-th input means; the personal information includes the first personal information to the N-th personal information; the storage portion for portable information equipment includes the first to the N-th storage portions for portable information equipment; the inquiry password includes the first to the N-th inquiry passwords corresponding to the first portable information equipment to the N-th portable information equipment; the first to the N-th storage portions further store the first identifying information to the N-th identifying information, respectively; the storage portion for battery charger further stores the first inquiry identifying information to the N-th inquiry identifying information corresponding to the first portable information equipment to the N-th portable information equipment. The i-th (i=1 to N) portable information equipment includes the i-th rechargeable battery, the i-th input means, the i-th storage portion for portable information equipment storing the i-th personal information and the i-th identifying information, and the i-th control portion for portable information equipment capable of transmitting/receiving information to/from the i-th storage portion for portable information equipment. When the M-th (M=either of 1 to N) portable information equipment out of the first to N-th portable information equipment is connected to the battery charger in the predetermined condition, information can be transmitted between the M-th control portion for portable information equipment and the control portion for battery charger, and the information management operation is automatically performed between the M-th storage portion for portable information equipment and the storage portion for battery charger, under the control of the M-th control portion for portable information equipment and the control portion for battery charger. The step (a) includes a step of judging both whether the M-th identifying information is consistent with the M-th inquiry identifying information or not and whether a password inputted from the M-th input means is consistent with the M-th inquiry password or not; the step (b) includes a step of, when both of the M-th identifying information and the password are judged consistent at the step (a) and the M-th personal information has been updated, performing backup processing by transferring the M-th personal information to the storage portion for battery charger as the M-th backup information; and the step (c) includes a step of, when both of the M-th identifying information and the password are judged consistent at the step (a), the M-th personal information has not been updated, and the contents of the M-th personal information are inconsistent with the contents of the M-th backup information, performing restore processing by transferring the M-th backup information to the M-th storage portion for portable information equipment as the M-th personal information.

According to a third aspect of the present invention, in the portable information equipment system of the first aspect, the storage portion for portable information equipment, except a portion for storing the identifying information, consists of a volatile memory.

According to a fourth aspect of the present invention, in the portable information equipment system of the first aspect, the portable information equipment further has an infrared transmit/receive portion for portable information equipment, and the battery charger further has an infrared transmit/receive portion for the battery charger. When the portable information equipment and the battery charger are connected in the predetermined condition, infrared information transfer between the infrared transmit/receive portion for portable information equipment and the infrared transmit/receive portion for the battery charger makes possible information transmission between the control portion for the portable information equipment and the control portion for the battery charger.

According to a fifth aspect of the present invention, in the portable information equipment system of the first aspect, the battery charger further includes: a charging terminal for the battery charger; and a modulator electrically connected to the charging terminal for the battery charger and the control portion for the battery charger, and capable of modulating a charging signal for charging the rechargeable battery by an information signal obtained from the storage portion for the battery charger to output a resultant modulating signal to the charging terminal for the battery charger. The portable information equipment further includes: a charging terminal for portable information equipment; and a demodulator electrically connected to the rechargeable battery, the control portion for portable information equipment, and the charging terminal for portable information equipment, and capable of demodulating the modulating signal obtained from the charging terminal for portable information equipment into a demodulating charging signal and a demodulating information signal and outputting the demodulating charging signal to the rechargeable battery and the demodulating information signal to the control portion for portable information equipment. When the portable information equipment and the battery charger are connected in the predetermined condition, the charging terminal for portable information equipment and the charging terminal for the battery charger are electrically connected so that the modulating signal can be outputted from the modulator and the demodulating charging signal and the demodulating information signal can be outputted from the demodulator, by which information transmission becomes possible between the control portion for portable information equipment and the control portion for the battery charger.

In the portable information equipment system of the first aspect, the information management operation performed concurrently with the charging operation of the rechargeable battery, comprises the steps of (a) judging whether a password inputted from the input means is consistent with the inquiry password or not; (b) when the input password is judged consistent at the step (a) and the personal information has been updated, performing backup processing by transferring the personal information to the storage portion in the battery charger as the backup information; and (c) when the input password is judged consistent at the step (a), the personal information has not been updated, and the contents of the personal information are inconsistent with the contents of the backup information, performing restore processing by transferring the backup information to the storage portion for portable information equipment as the personal information.

At the step (b), the backup processing of the updated personal information in the storage portion for portable information equipment is automatically performed. When the personal information has not been updated but in an imperfect condition, the restore processing is automatically performed at the step (c) by transferring the backup information in the battery charger to the storage portion for portable information equipment as the personal information. Thus, even in case of loss, the personal information in the storage portion for portable information equipment can be automatically restored to its state at the time of the previous charge.

By using a relatively inexpensive and low-power memory to form the storage portion for portable information equipment, without emphasizing the information-holding properties of the memory, it becomes possible to obtain a portable information equipment system having an information registration function as well as to reduce manufacturing cost and power consumption thereof.

Besides, at the step (a) to be the starting condition of the steps (b) and (c), the check using the inquiry password totally avoids a risk that a third party not an user may commit piracy of the backup information in the storage portion for battery charger by connecting the portable information equipment and the battery charger. This minimizes diminution in security due to the backup information stored in the storage portion for battery charger.

In the portable information equipment system of the second aspect, the portable information equipment includes the first portable information equipment to the N-th ($N \geq 2$) portable information equipment. If the M-th (M=either of 1 to N) portable information equipment out of the first portable information equipment to the N-th portable information equipment is connected to the battery charger in a predetermined condition, information transmission becomes possible between the M-th control portion for portable information equipment and the control portion for battery charger. Further, concurrent with the charging operation of the M-th rechargeable battery, the information management operation is automatically performed between the M-th storage portion for portable information equipment and the storage portion for battery charger, under the control of the M-th control portion for portable information equipment and the control portion for battery charger. Thus, the portable information equipment system comprising the first portable information equipment to the N-th portable information equipment and the battery charger can obtain the same effect as the system of the first aspect.

Besides, at the step (a) to be the starting condition of the steps (b) and (c), the check using the M-th inquiry identifying information and the M-th inquiry password totally avoids a risk that other portable information equipment which can be connected to the battery charger, not the M-th portable information equipment, may be used to commit piracy of the backup information. This prevents diminution in security even if the storage portion for battery charger, common to the first portable information equipment to the N-th portable information equipment, stores the first backup information to the N-th backup information.

In the portable information equipment system of the third aspect, the storage portion for portable information equipment, except a portion for storing the identifying information, consists of a volatile memory. This achieves low manufacturing cost, low power consumption, and increased access speed to the memory.

In the portable information equipment system of the fourth aspect, when the portable information equipment and the battery charger are connected in a predetermined condition, infrared information transfer between the infrared transmit/receive portion for portable information equipment and the infrared transmit/receive portion for battery charger makes possible information transmission between the control portion for portable information equipment and the control portion for battery charger, during the charging operation of the rechargeable battery.

As a result, without directly connecting the portable information equipment and the battery charger, a signal can be transmitted through the infrared transmit/receive portion for portable information equipment and the infrared transmit/receive portion for battery charger. This increases reliability of the signal transmission.

In the portable information equipment system of the fifth aspect, when the portable information equipment and the battery charger are connected in a predetermined condition, the charging terminal for portable information equipment and the charging terminal for battery charger are electrically connected so that the modulating signal can be outputted from the modulator in the battery charger and the demodulating charging signal and the demodulating information signal can be outputted from the demodulator in the portable information equipment. This makes possible information transmission between the control portion for portable information equipment and the control portion for battery charger, during the charging operation of the rechargeable battery.

The use of the charging terminals for the signal transmission between the portable information equipment and the battery charger avoids the necessity of providing another external terminal for the information signal transfer. This simplifies circuit structure.

An object of the present invention is to obtain a portable information equipment system having an information registration function while reducing manufacturing cost and power consumption thereof.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
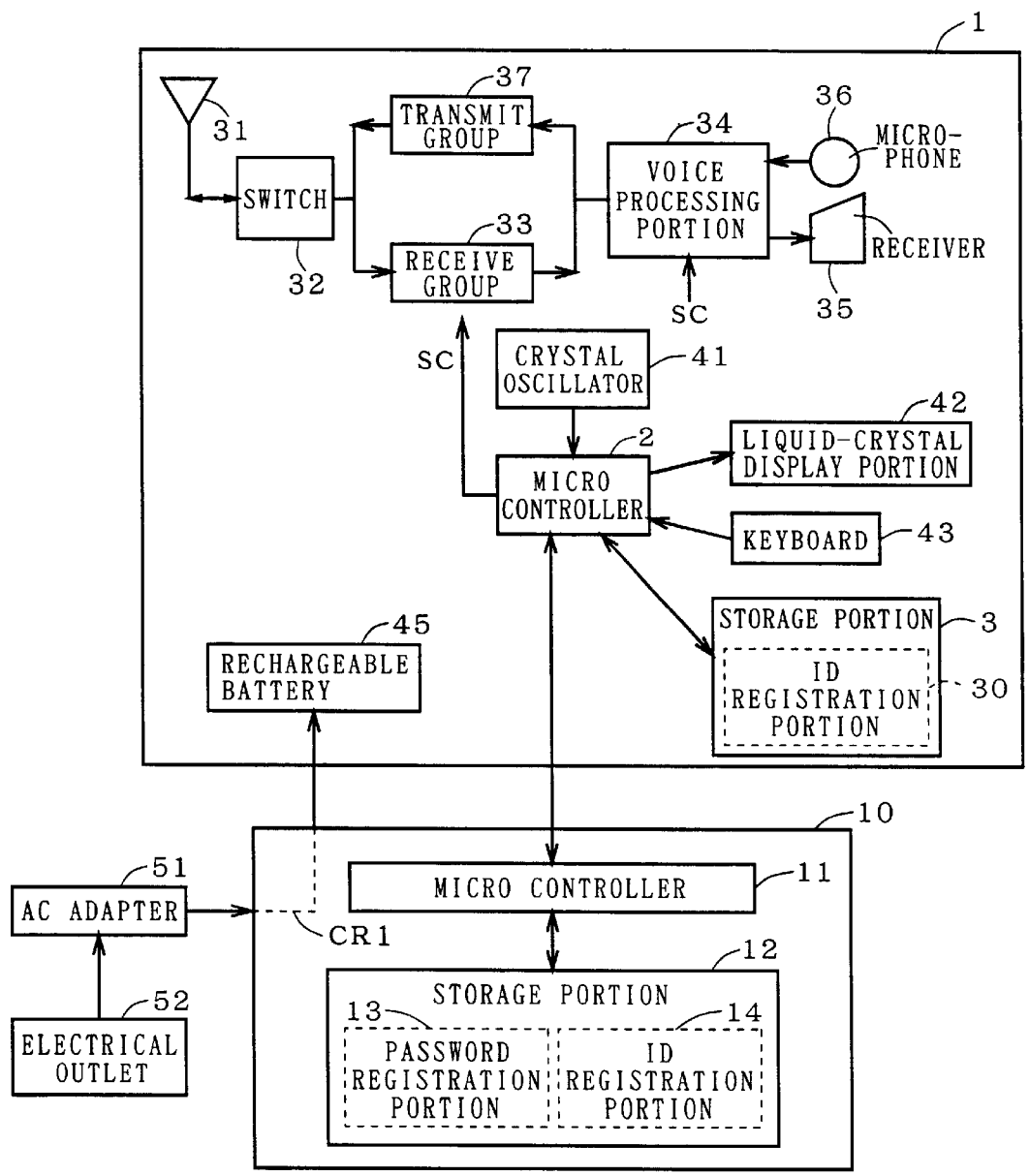
FIG. 1 is a block diagram of the structure of a portable information equipment system according to a first preferred embodiment of the present invention.

FIG. 1 is a block diagram of the structure of a portable information equipment system according to a first preferred embodiment of the present invention.

In portable information equipment 1, an antenna 31 transmits and receives a radio wave. The radio wave received from the antenna 31 is transmitted via a switch 32 to a receive group 33 to be subjected to signal processing. The signal processed in the receive group 33 is transmitted to a voice processing portion 34 where the signal goes through voice processing to be a voice signal. Then, a receiver 35 receives the voice signal and emits a voice therefrom.

A microphone 36 receives a voice signal and transmits the signal to the voice processing portion 34. The voice processing portion 34 performs signal processing of the voice from the microphone 36, and transmits it to a transmit group 37. After performing signal processing of the signal from the voice processing portion 34, the transmit group 37 transmits it as a radio wave via the switch 32 to the antenna 31.

The receive group 33, the transmit group 37, and the voice processing portion 34 are controlled by a circuit control signal SC from a micro controller 2. The micro controller 2, operating on the basis of a clock generated by a crystal oscillator 41, controls a display of a liquid-crystal display portion 42, receives an input from a keyboard 43, or performs the reading and writing from/to a storage portion 3 as well as outputting the circuit control signal SC.

The liquid-crystal display portion 42 displays information, such as an input from the keyboard 43 and received electric field strength. The keyboard 43 receives information input such as a phone number, or receives password input in information management operation during charging. The storage portion 3 registers identifying (ID) information unique to the portable information equipment 1 as well as personal information such as a phone number, in an ID registration portion 30.

A rechargeable battery 45 is an operating power source of the portable information equipment 1. A battery charger 10 charges the battery 45 when electrically connected to the portable information equipment 1 in a predetermined condition.

Having a charging path CR1 from an AC adapter 51 connected to an electrical outlet 52 to the rechargeable battery 45, the battery charger 10 charges the rechargeable battery 45 with electricity obtained from the electrical outlet 52 through the charging path CR1.

The battery charger 10 consists of a micro controller 11 and a storage portion 12 for storing backup information of the personal information stored in the portable information equipment 1. The storage portion 12 further registers an inquiry password in a password registration portion 13 and inquiry ID information in an ID registration portion 14.

When the portable information equipment 1 and the battery charger 10 are connected to be chargeable, the micro controller 11 can transmit and receive a signal to/from the micro controller 2 in the portable information equipment 1.

This makes possible information management under the control of the micro controllers 2 and 11. In the operation, the personal information stored in the storage portion 3 in the portable information equipment 1 is transferred to the storage portion 12 in the battery charger 10 as the backup information, or the backup information stored in the storage portion 12 is transferred to the storage portion 3 as the personal information.

Figure 2:
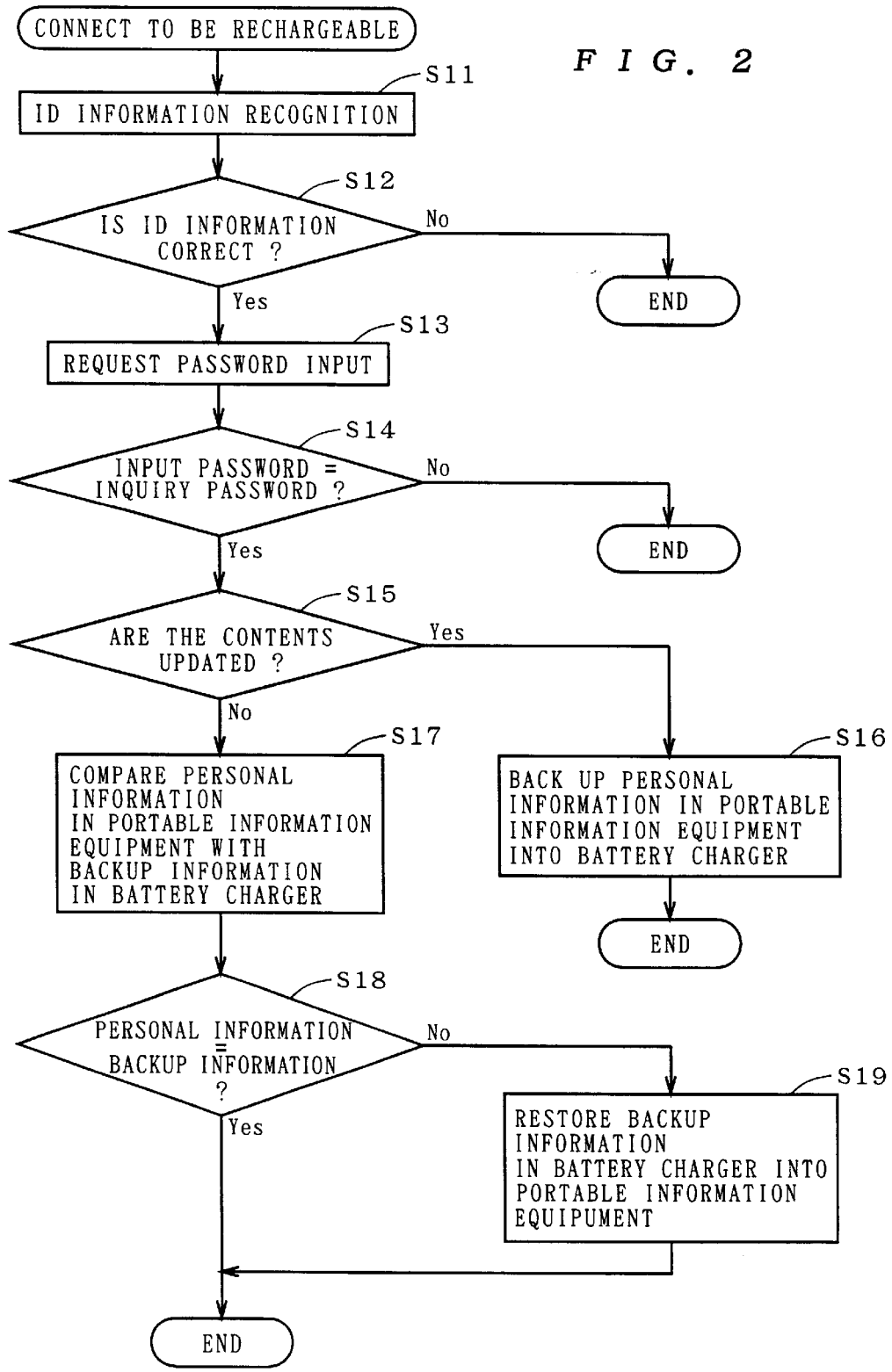
FIG. 2 is a flow chart of information management processing during charging in the portable information equipment system according to the first preferred embodiment.

FIG. 2 is a flow chart of information management operation performed when the portable information equipment and the battery charger of the first preferred embodiment are connected to be chargeable. This operation is controlled by the micro controllers 2 and 11. Whether the equipment and the battery charger are chargeable or not can be detected, for example, by detecting the point in time that information transmission between the micro controllers 2 and 11 becomes possible.

Referring to FIG. 2, recognition of the ID information is made at a step S11. More specifically, the ID information registered in the ID registration portion 30 in the storage portion 3 is recognized under the control of the micro controller 2.

Then, at a step S12, whether the ID information recognized at the step S11 is correct or incorrect is judged according to consistency/inconsistency between the recognized ID information and the inquiry ID information registered in the ID registration portion 14 in the storage portion 12. When the ID information is incorrect ("No"), the information management operation is terminated. When the ID information is correct ("Yes"), the operation is continued on a step S13.

At the step S13, a message is displayed on the liquid-crystal display portion 42 to prompt an user to enter a password from the keyboard 43. The input of a password advances the operation to a step S14.

At the step S14, whether the password inputted at the step S13 is correct or incorrect is judged according to consistency/inconsistency between the input password and the inquiry password registered in the password registration portion 13. When the input password is incorrect ("No"), the information management operation is terminated. When the input password is correct ("Yes"), the operation is continued on a step S15.

Checked at the step S15 is whether the contents of the personal information stored in the storage portion 3 have been updated or not during the ordinary use of the portable information equipment 1: the equipment 1 and the battery charger 10 are not connected electrically. When the personal information has been updated ("Yes"), the operation goes to a step S16. When the personal information has not been updated ("No"), the operation goes to a step S17. Whether the personal information in the storage portion 3 has been updated or not can be judged by detecting the value, "1" or "0", of an update bit which is provided in the storage portion 3 and set to "1" when the personal information is updated.

At the step S16, a backup of the updated personal information in the storage portion 3 is considered necessary. Thus, the personal information in the storage portion 3 in the portable information equipment 1 is transferred to the storage portion 12 of the battery charger 10 as the backup information. After this backup processing, the information management operation is terminated. If the update bit is provided in the storage portion 3, the update bit is set to "0" after the backup processing.

At the step S17, on the other hand, the personal information stored in the storage portion 3 and the backup information stored in the storage portion 12 are compared to check consistency/inconsistency therebetween at a step S18.

When the personal information and the backup information are judged consistent at the step S18 ("Yes"), the personal information in the portable information equipment 1 is considered to have been held perfectly. Thus, the information management operation is terminated.

When they are judged inconsistent at the step S18 ("No"), on the other hand, the personal information in the portable information 1 is considered to have been erased or to have been held imperfectly. Thus, at the step S19, the backup information in the storage portion 12 in the battery charger 10 is transferred to the storage portion 3 in the portable information equipment 1 as the personal information. After this restore processing of the personal information, the information management operation is terminated.

In this manner, when the portable information equipment 1 and the battery charger 10 are connected to be chargeable (in a predetermined condition), the portable information equipment system of the first preferred embodiment can not only perform the charging operation, using the connection as a trigger, but also automatically perform the information management processing of the personal information stored in the storage portion 3 in the portable information equipment 1.

More specifically, when the personal information in the portable information equipment 1 is updated, the system performs backup processing by transferring that personal information to the storage portion 12 in the battery charger 10 as the backup information. Further, when the personal information in the portable information equipment 1 is not updated and but in an imperfect condition, the system performs restore processing by transferring the backup information in the battery charger 10 to the storage portion 3 as the personal information.

Thus, even in case of loss, the personal information in the storage portion in the portable information equipment 1 can be automatically restored to its state at the time of the previous charge (backup information in the storage portion 12 in the battery charger 10).

This avoids the necessity of emphasizing the information-holding properties of the memory. Thus, by using a relatively inexpensive and low-power memory to form the storage portion 3 in the portable information equipment 1, it becomes possible to obtain a portable information equipment system having an information registration function as well as to reduce manufacturing cost and power consumption thereof.

Further, the recognition of the ID information and the check using a password totally avoids a risk that other portable information equipment which can be connected to the battery charger 10 may be used to commit piracy of the backup information in the storage portion 12 in the battery charger 10, or that a third party not an user may commit piracy of the backup information in the storage portion 12 in the battery charger 10 by connecting the power information equipment 1 and the battery charger 10. This minimizes a diminution in security due to the backup information stored in the storage portion 12 in the battery charger 10.

2. Second Preferred Embodiment

Figure 3:
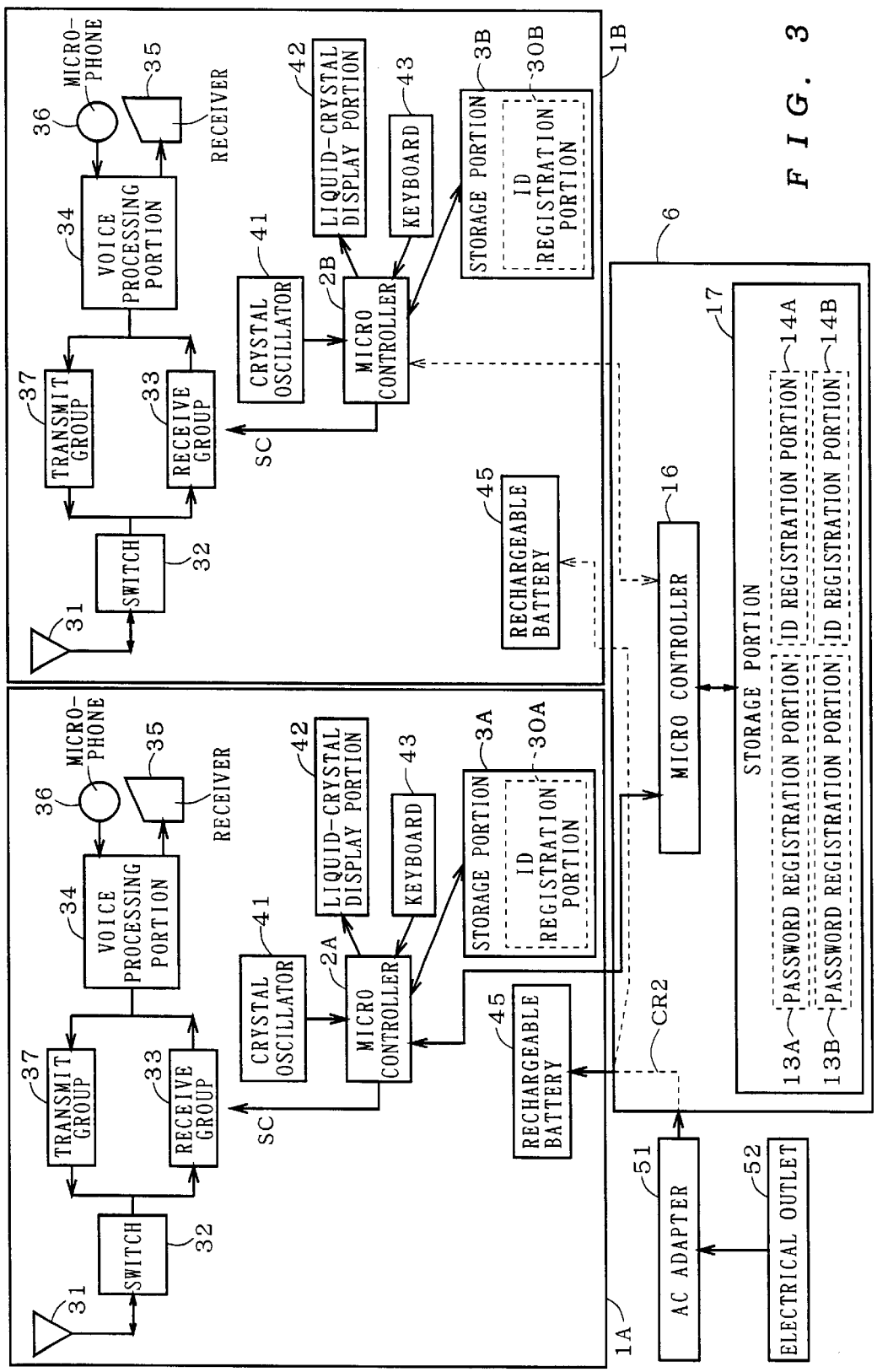
FIG. 3 is a block diagram of the structure of a portable information equipment system according to a second preferred embodiment of the present invention.

FIG. 3 is a block diagram of the structure of a portable information equipment system according to a second preferred embodiment of the present invention. As shown, the portable information equipment system of the second preferred embodiment comprises two sets of portable information equipment 1A, 1B, and one battery charger 6.

Each portable information equipment 1A, 1B has the same internal structure as the portable information equipment 1 of the first preferred embodiment shown in FIG. 1. Thus, the same components as those in FIG. 1 are indicated by the same reference numerals, and the descriptions thereof will be omitted.

A storage portion 3A in the portable information equipment 1A registers ID information (first ID information) unique to the portable information equipment 1A as well as personal information (first personal information) such as a phone number, in an ID registration portion 30A. A storage portion 3B in the portable information equipment 1B registers ID information (second information) unique to the portable information equipment 1B as well as personal information (second personal information) such as a phone number, in an ID registration portion 30B.

Having a charging path CR2 from the AC adapter 51 connected to the electrical outlet 52 to the rechargeable battery 45, the battery charger 6 can charge each rechargeable battery 45 in the portable information equipment 1A, 1B with the voltage obtained from the electrical outlet 52 through the charging path CR2.

The battery charger 6 consists of a micro controller 16 and a storage portion 17. The storage portion 17 registers first and second inquiry passwords to password registration portions 13A and 13B, respectively, and first inquiry ID information and second inquiry ID information in ID registration portions 14A and 14B, respectively, as well as storing the first backup information of the first personal information stored in the portable information equipment 1A and the second backup information of the second personal information stored in the portable information equipment 1B.

The first inquiry password and the first inquiry ID information are for the portable information equipment 1A, while the second inquiry password and the second inquiry ID information are for the portable information equipment 1B.

When the portable information equipment 1A, 1B and the battery charger 6 are connected to be chargeable, the micro controller 16 can transmit or receive a signal to/from the micro controller 2A, 2B in the portable information equipment 1A, 1B.

Thus, information management under the control of the micro controller 2A or 2B and 16 becomes possible. In the operation, the first or second personal information stored in the storage portion 3A or 3B in the portable information equipment 1A or 1B is transferred to the storage portion 17 as the first or second backup information, or the first or second backup information stored in the storage portion 17 is transferred to the storage portion 3A or 3B as the first or second personal information.

Figure 4:
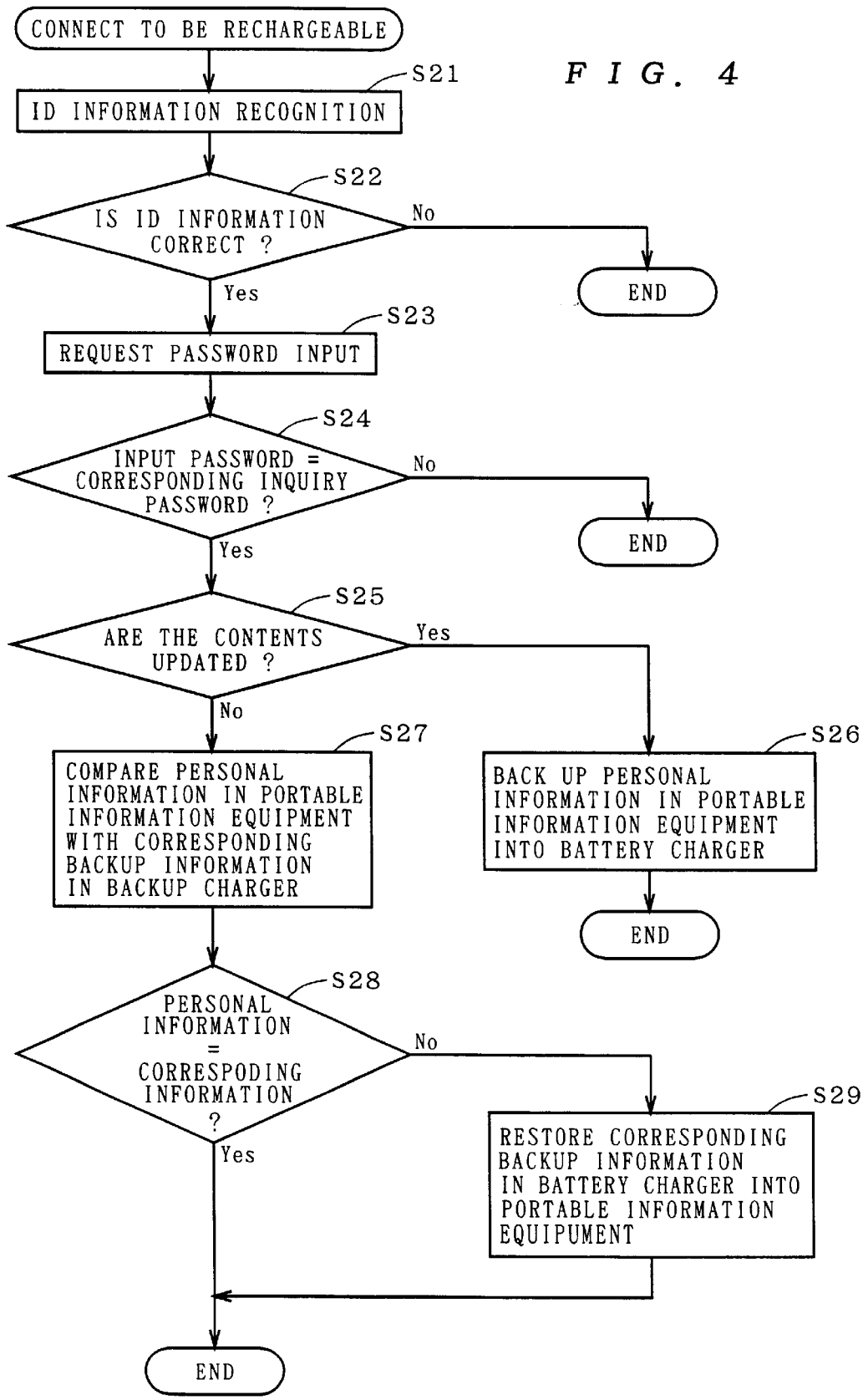
FIG. 4 is a flow chart of information management processing during charging in the portable information equipment system according to the second preferred embodiment.

FIG. 4 is a flow chart of information management operation performed when the portable information equipment and the battery charger is connected to be chargeable, in the portable information equipment system according to the second preferred embodiment. This operation is controlled by the micro controllers 2A or 2B and 16. The following description of the operation is given on the assumption that the portable information equipment 1A and the battery charger 6 are connected to be chargeable.

Referring to FIG. 4, recognition of the ID information is made at the step S21. That is, the ID information registered in the ID registration portion 30A is recognized under the control of the micro controller 2A.

Then, at a step S22, the ID information recognized at the step S21 is compared with both the first inquiry ID information and the second inquiry ID information registered in the ID registration portions 14A and 14B in the storage portion 17, respectively, to judge whether the recognized ID information is correct or incorrect according to consistency/inconsistency between the recognized ID information and at least one of the first inquiry ID information and the second inquiry ID information. When the ID information is incorrect ("No"), the information management operation is terminated. When the ID information is correct ("Yes"), the operation is continued on a step S23.

At this time, consistency between the recognized ID information and the first inquiry ID information allows the micro controller 16 in the battery charger 6 to recognize that the equipment connected to the battery charger 6 is the portable information equipment 1A.

At the step S23, a message is displaced on the liquid-crystal display portion 42 in the portable information equipment 1A to prompt an user to enter a password from the keyboard 43. The input of a password advances the operation to a step S24.

At the step S24, whether the password inputted at the step S23 is correct or incorrect is judged according to consistency/inconsistency between the input password and the first inquiry password registered in the password registration portion 13A. When the input password is incorrect ("No"), the information management operation is terminated. When the input password is correct ("Yes"), the operation is continued on a step S25.

Checked at the step S25 is whether the contents of the first personal information stored in the storage portion 3A has been updated or not during the ordinary use of the portable information equipment 1A. When the personal information has been updated ("Yes"), the operation goes to a step S26. When the personal information has not been updated ("No"), the operation goes to a step S27.

At the step S26, a backup of the updated first personal information in the storage portion 3A is considered necessary. Thus, the first personal information in the storage portion 3A in the portable information equipment 1A is transferred to the storage portion 17 in the battery charger 6 as the first backup information. After this backup processing, the information management operation is terminated.

At the step S27, on the other hand, the first personal information stored in the storage portion 3A and the first backup information stored in the storage portion 17 are compared to check consistency/inconsistency therebetween at a step S28.

When judged consistent at step S28 ("Yes"), the first personal information in the portable information equipment 1A is considered to have been held perfectly. Thus, the information management operation is terminated.

On the other hand, when judged inconsistent at the step S28 ("No"), the first personal information in the portable information equipment 1A is considered to have been held imperfectly (or erased). Thus, at a step S29, the first personal information in the storage portion 3A in the portable information equipment 1A is restored by transferring the first backup information in the storage portion 17 in the battery charger 6 to the storage portion 3A in the portable information equipment 1A as the first personal information. After this restore processing, the information management operation is terminated.

The foregoing example shows the case where the portable information equipment 1A and the battery charger 6 are connected. The similar information management operation will be performed for the second personal information in the portable information equipment 1B when the portable information equipment 1B and the battery charger 6 are connected.

In this manner, when the portable information equipment 1A or 1B and the battery charger 6 are connected to be chargeable, the portable information equipment system of the second preferred embodiment can not only perform the charging operation but also automatically perform the information management processing of the first or second personal information stored in the storage portion 3A, 3B in the portable information equipment 1A, 1B.

More specifically, when the first personal information in the personal information equipment 1A is updated, the system performs backup processing by transferring that first personal information to the storage portion 17 in the battery charger 6 as the first backup information. Further, when the personal information in the portable information equipment 1A is not updated and but in an imperfect condition, the system performs restore processing by transferring the first backup information in the battery charger 6 to the storage portion 3A as the first personal information.

Similarly, when the second personal information in the personal information equipment 1B is updated, the system performs backup processing by transferring that second personal information to the storage portion 17 in the battery charger 6 as the second backup information. Further, when the second personal information in the portable information equipment 1B is not updated and but in imperfect condition, the system performs restore processing by transferring the second backup information in the battery charger 6 to the storage portion 3B as the second personal information Besides, the recognition of the ID information and the check using a password make possible accurate recognition of the portable information equipment 1A, 1B or of an user. This not only increases security for information as in the first preferred embodiment but also permits the information management operation during charging without diminishing security even if the battery charger 6 is common to both the portable information equipment 1A and 1B.

3. Third Preferred Embodiment

A portable information equipment system according to a third preferred embodiment uses only a volatile memory without any nonvolatile memory to form a storage portion except a portion for storing the ID information. The storage portion corresponds to the storage portion 3 in the portable information equipment 1 shown in FIG. 1 or the storage portions 3A, 3B in the portable information equipment 1A, 1B shown in FIG. 3.

By forming most of the storage portion in the portable information equipment of a volatile memory, the system achieves low manufacturing cost, low power consumption, and increased access speed to the memory.

In this case, if the rechargeable battery in the portable information equipment is discharged, the contents in the storage portion will be lost. However, by connecting the portable information equipment and the battery charger to be chargeable, the personal a loss of information can be minimized.

4. Fourth Preferred Embodiment

Figure 5:
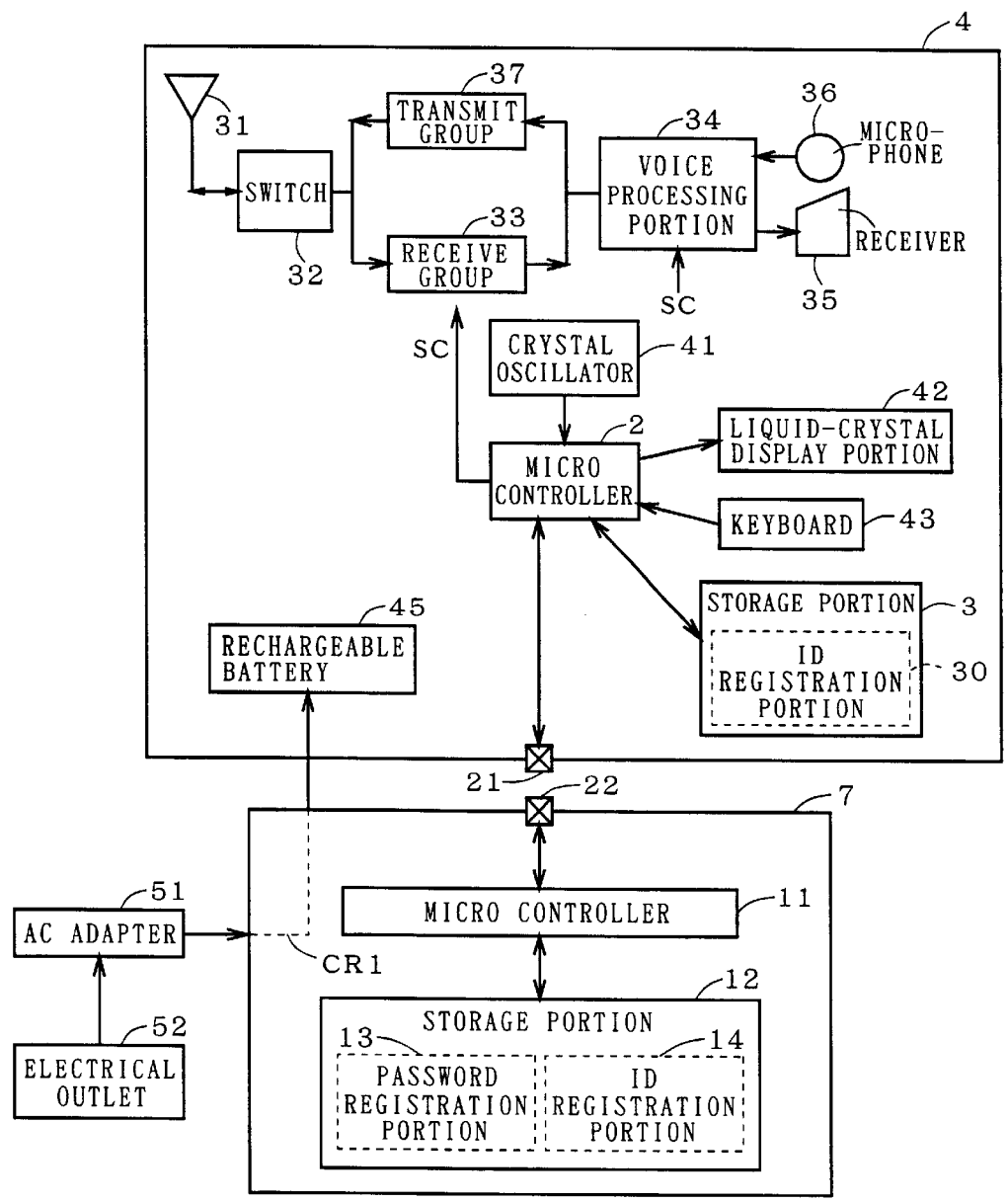
FIG. 5 is a block diagram of the structure of a portable information equipment system according to a fourth preferred embodiment of the present invention.

FIG. 5 is a block diagram of the structure of a portable information equipment system according to a fourth preferred embodiment of the present invention. As shown, the portable information equipment system of the fourth preferred embodiment comprises portable information equipment 4 and a battery charger 7.

The portable information equipment 4 has the same internal structure as the portable information equipment 1 of the first preferred embodiment shown in FIG. 1. Thus, the same components as those in FIG. 1 are indicated by the same reference numerals, and the descriptions thereof will be omitted.

The portable information equipment 4 includes an infrared transmit/receive portion 21 electrically connected to the micro controller 2, by which infrared data communication with an external device becomes possible.

The battery charger 7 has the same internal structure as the battery charger 10 of the first preferred embodiment shown in FIG. 1. Thus, the same components as those in FIG. 1 are indicated by the same reference numerals, and the descriptions thereof will be omitted.

Having the charging path CR1 from the AC adapter 51 connected to the electrical outlet 52 to the rechargeable battery 45, the battery charger 7 can charge the rechargeable battery 45 in the portable information equipment 4 with the voltage obtained from the electrical outlet 52 through the charging path CR1.

The battery charger 7 further includes an infrared transmit/receive portion 22 electrically connected to a micro controller 11, by which infrared data communication with an external device becomes possible.

The infrared transmit/receive portions 21 and 22 are formed to oppose to each other in the portable information equipment 4 and the battery charger 7, respectively. Thus, when the portable information equipment 4 and the battery charger 7 are connected to be chargeable, the infrared data communication between the infrared transmit/receive portions 21 and 22 makes possible signal transmission between the micro controller 11 in the battery charger 7 and the micro controller 2 in the portable information equipment 4, during charging.

Thus, by using the infrared transmit/receive portions 21 and 22, the information management operation can be performed under the control of the micro controllers 2 and 11 as shown in FIG. 2 of the first preferred embodiment. In the operation, the personal information in the storage portion 3 in the portable information equipment 4 is transferred to the storage portion 12 as the backup information, or the backup information in the storage portion 12 is transferred to the storage portion 3 as the personal information.

Further, the signal transmission between the portable information equipment 4 and the battery charger 7 can be made through the infrared transmit/receiver portions 21 and 22 without directly connecting the portable information equipment 4 and the battery charger 7. This prevents rust due to metal contact, thereby allowing highly reliable information transmission.

5. Fifth Preferred Embodiment

Figure 6:
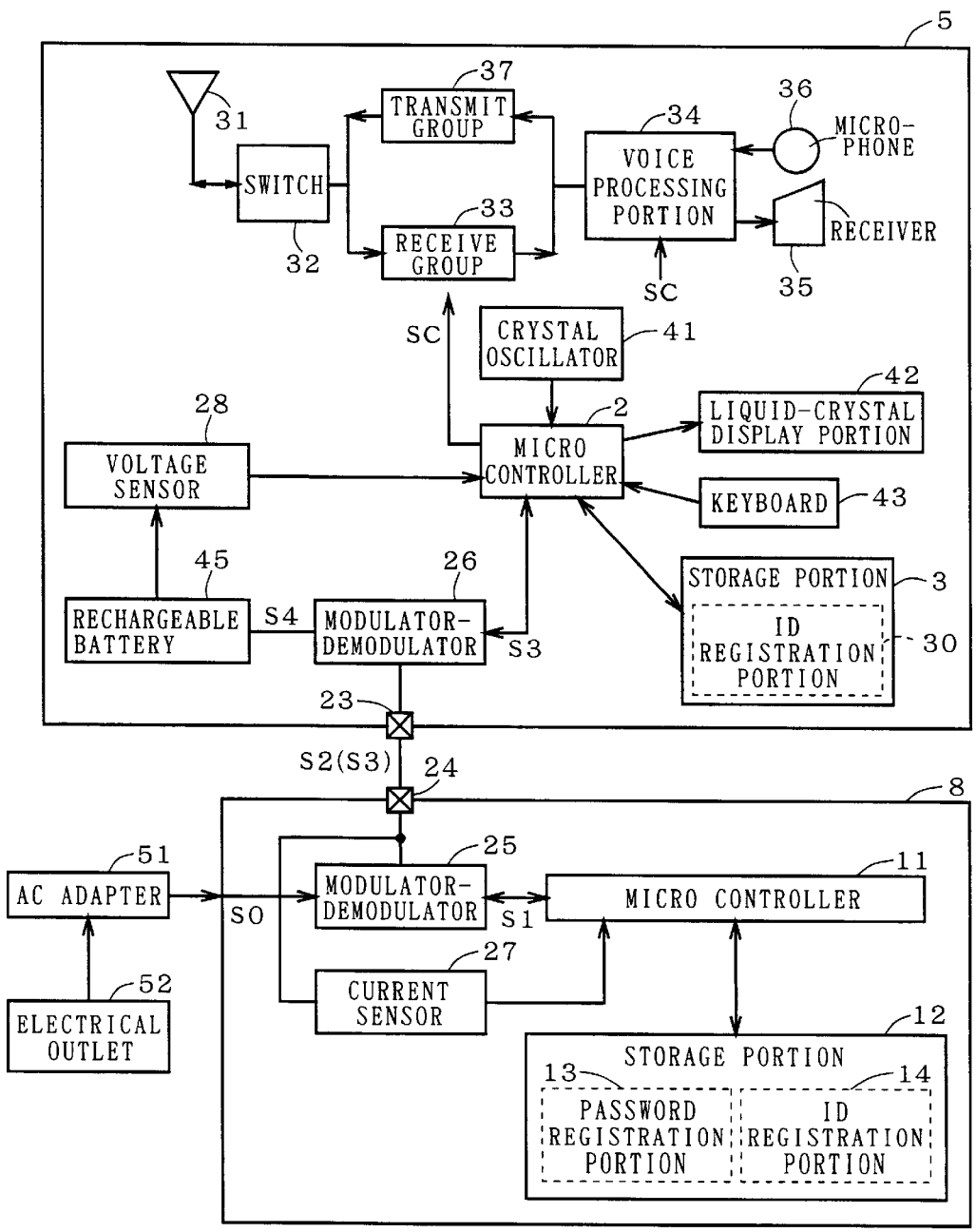
FIG. 6 is a block diagram of the structure of a portable information equipment system according to a fifth preferred embodiment of the present invention.

FIG. 6 is a block diagram of the structure of a portable information equipment system according to a fifth preferred embodiment of the present invention. As shown, the portable information equipment system of the fifth preferred embodiment comprises portable information equipment 5 and a battery charger 8.

The portable information equipment 5 has the same internal structure as the portable information equipment 1 of the first preferred embodiment shown in FIG. 1. Thus, the same components as those in FIG. 1 are indicated by the same reference numerals, and the descriptions thereof will be omitted.

Electrically connected to the micro controller 2, a charging terminal 23, and the rechargeable battery 45, a modulator-demodulator 26 demodulates a modulating signal S2 obtained from the charging terminal 23 into a charging signal S4 and an information signal S3. The modulator-demodulator 26 then outputs the charging signal S4 to the rechargeable battery 45 and the information signal S3 to the micro controller 2, or outputs the information signal S3 obtained from the micro controller 2 to the charging terminal 23 just as it is.

The rechargeable battery 45 is charged with the charging signal S4 from the modulator-demodulator 26. A voltage sensor 28 senses a voltage at the rechargeable battery 45, and transfers the result as sense voltage information to the micro controller 2.

The battery charger 8 has the same internal structure as the battery charger 10 of the first preferred embodiment shown in FIG. 1. Thus, the same components as those in FIG. 1 are indicated by the same reference numerals, and the descriptions thereof will be omitted.

Electrically connected to the micro controller 11 and a charging terminal 24, a modulator-demodulator 25 modulates an information signal S1 obtained from the micro controller 11 and a charging signal S0 obtained from the AC adapter 51. The modulator-demodulator 25 then outputs the modulating signal S2 to the charging terminal 24, or outputs the information signal S3 obtained from the charging terminal 23 to the micro controller 11, just as it is as the information signal S1.

The charging terminals 23 and 24 in the portable information equipment 5 and the battery charger 8, respectively, can be electrically connected to be chargeable.

With the portable information equipment 5 and the battery charger 8 connected to be chargeable, information transmission between the charging terminals 23 and 24 makes possible signal transmission between the micro controller 11 in the battery charger 8 and the micro controller 2 in the portable information equipment 5, during charging.

When the portable information equipment 5 and the battery charger 8 are ready for charging, current flows between the charging terminal 24 and the modulator-demodulator 25. This current is sensed by a current sensor 27, by which the information that the portable information equipment 5 and the battery charger 8 are ready for charging can be given to the micro controller 11.

Figure 7:
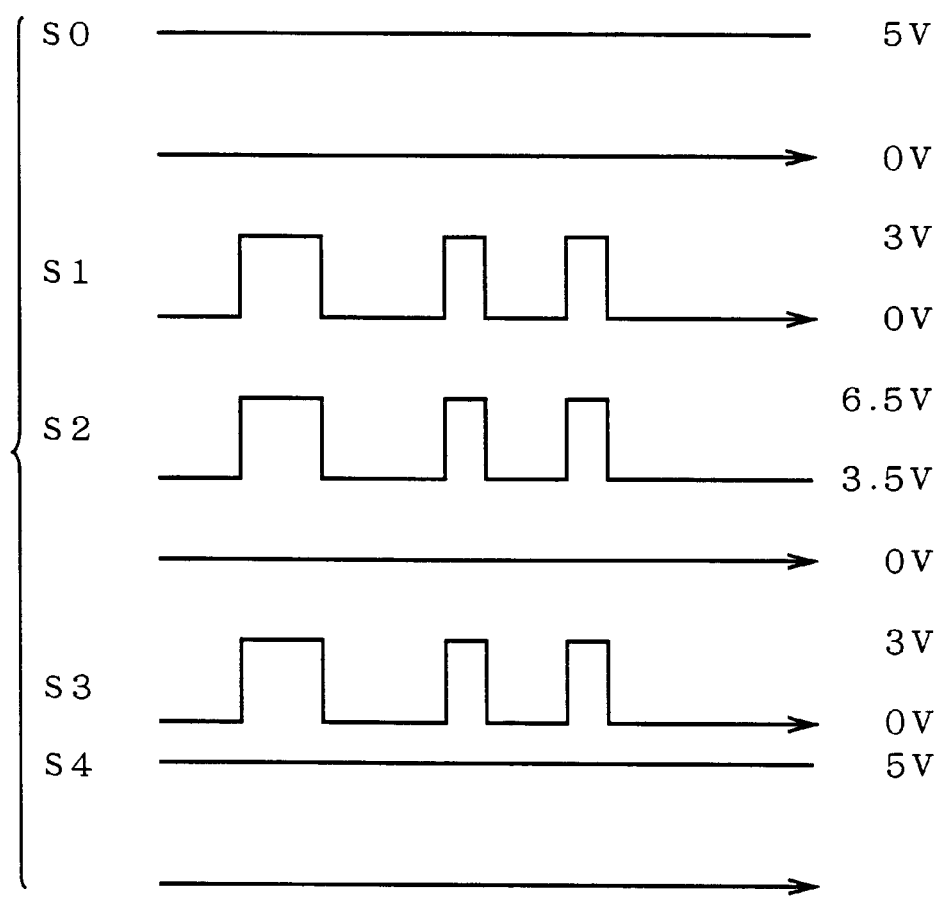
FIG. 7 is a timing chart illustrating signal transmission processing during charging in the portable information equipment system according to the fourth preferred embodiment.
Figure 8:
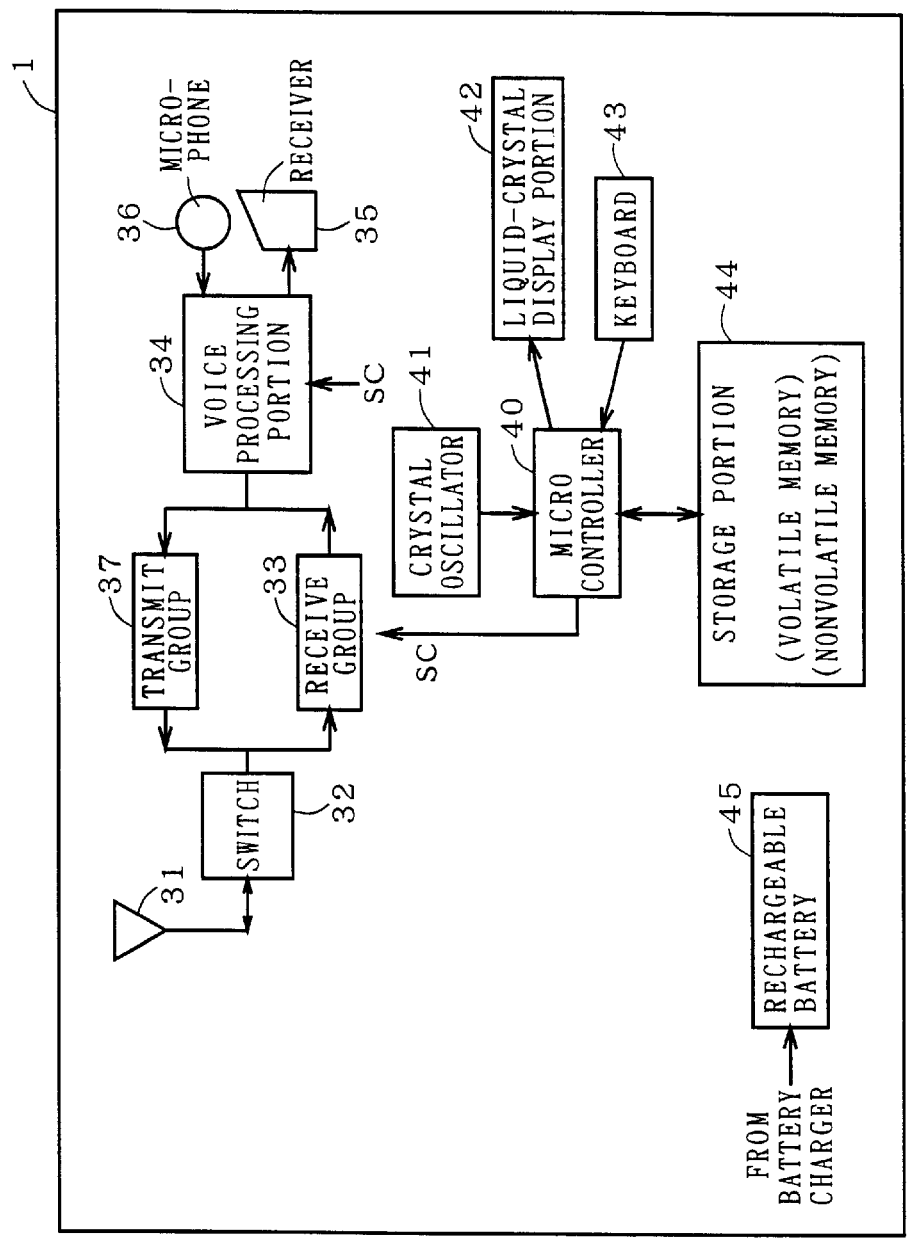
FIG. 8 is a block diagram of the structure of conventional portable information equipment.
Figure 9:
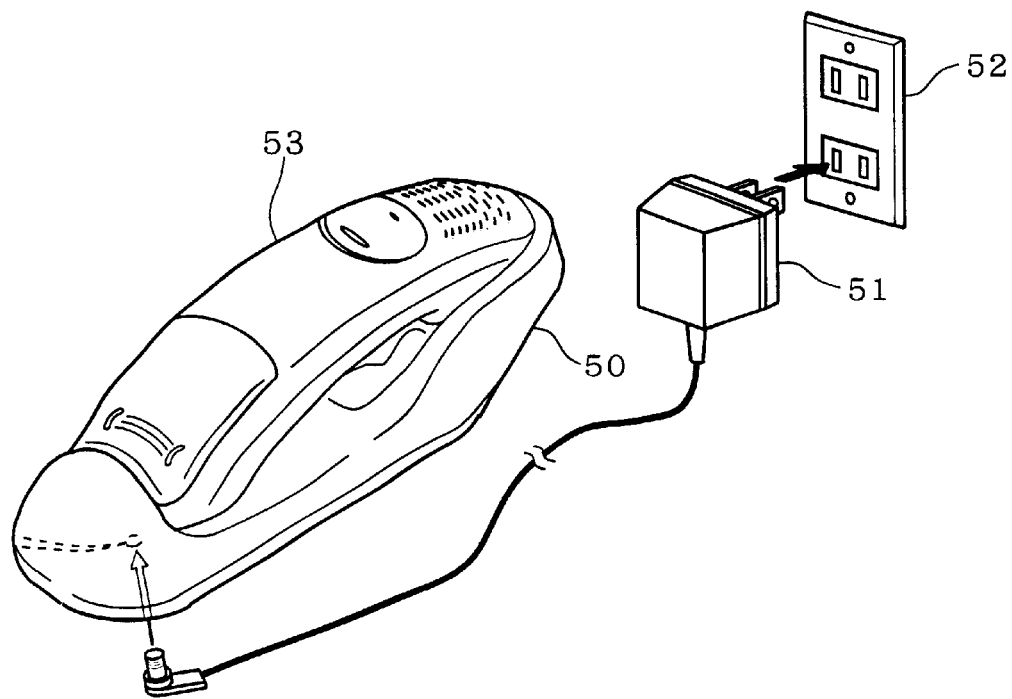
FIG. 9 is a perspective view illustrating the state of a connection between the conventional portable information equipment and a battery charger.

FIG. 7 is a timing chart illustrating charging operation and information transfer operation in the portable information equipment system of the fifth preferred embodiment. As shown, the modulator-demodulator 26 modulates a 5 Vdc charring signal S0 by the information signal S1 obtained from the micro controller 11, and outputs the modulating signal S2.

This modulating signal S2 is transmitted through the charging terminals 24 and 23 to the modulator-demodulator 26 in the portable information equipment 5. Then, the modulator-demodulator 26 demodulates the modulating signal S2 into the charging signal S4 equivalent to the charging signal S0, and the information signal S3 equivalent to the information signal S1. Consequently, the rechargeable battery 45 is charged with the charging signal S0, while the information signal S3 is transmitted to the micro controller 2.

In this manner, information transfer from the micro controller 11 in the battery charger 8 to the micro controller 2 in the portable information equipment 5 can be performed concurrently with the charging of the rechargeable battery 45 in the portable information equipment 5 by the battery charger 8.

On the other hand, when the voltage sensor 28 brings the voltage at the rechargeable battery 45 to a predetermined level, it is determined that the charging state of the rechargeable battery 45 has reached a predetermined reference point. This permits information transfer from the micro controller 2 through the modulator-demodulator 26, the charging terminals 23 and 24, and the modulator-demodulator 25 to the micro controller 11. In this case, the modulator-demodulators 25 and 26 only pass the signal.

By using the charging terminals 23 and 24, the information management under the control of the micro controllers 2 and 11 becomes possible. In the operation, the personal information in the storage portion 3 in the portable information equipment 5 is transferred to the storage portion 12 as the backup information, or the backup information in the storage portion 12 is transferred to the storage portion 3 as the personal information.

The use of the charging terminals 23 and 24 for the signal transmission between the portable information equipment 5 and the battery charger 8 avoids the necessity of providing another external terminal for information transfer. This simplifies the circuit structure.

6. Other Effect

In the first through fifth preferred embodiments, if the storage portion in the battery charger consists of a nonvolatile memory, the personal information in the portable information equipment can be held as the backup information in the storage portion in the battery charger even if the battery charger is not always connected to the electrical outlet. This increases reliability of the backup processing of the personal information.

In the fourth and the fifth preferred embodiment, there is a one-to-one correspondence between the portable information equipment and the battery charger, as in the first preferred embodiment. However, those embodiments are of course applicable to such a case that more than one sets of portable information equipment are provided for one battery charger as in the second preferred embodiment.

While the invention has been described in detail, the foregoing description is in all aspects illustrative and not restrictive. It is understood that numerous other modifications and variations can be devised without departing from the scope of the invention.

I claim:

1. A method of managing information residing in a portable information equipment, the method comprising:
   a first step of judging whether information stored in a storage portion provided in said portable information equipment is one of updated and not updated; and
   a second step of backing up the information stored in said storage portion on another storage portion provided in another equipment under a judgment that the information stored in the storage portion is updated in said first step.

2. The method according to claim 1, further comprising:
   a third step of judging whether the information stored in said storage portion is one of consistent with information stored in said another storage portion and inconsistent with information stored in said another storage portion under a judgment that the information stored in the storage portion is not updated in said first step; and
   a fourth step of transferring the information stored in said another storage portion into said storage portion under a judgment that the information stored in the storage portion is inconsistent with information stored in said another storage portion in said third step.

3. The method according to claim 1, further comprising a third step of judging whether an ID stored in said storage portion is consistent with an ID registered in said another storage portion, wherein said first step is allowed under a judgment that the ID stored in said storage portion is consistent with the ID registered in said another storage portion in said third step.

4. The method according to claim 1, further comprising:
   a third step of requesting a password to be input on said portable information equipment, and
   a fourth step of judging whether the password is consistent with a registered password in said another storage portion, wherein said first step is allowed under a judgment that the password is consistent with the registered password in said another storage portion in said fourth step.

5. The method according to claim 1, wherein said storage portion includes an update bit indicating whether the information stored in said storage portion is one of updated and not updated, wherein said first step includes a step of referring to the update bit.

6. The method according to claim 1, wherein said another storage portion includes IDs registered in a plurality of ID registration portions holding respective IDs, the method further comprising:
   a third step of judging whether an ID stored in said storage portion is consistent with at least one of the IDs registered in said plurality of ID registration portions, wherein said first step is allowed under a judgment that the ID stored in said storage portion is consistent with at least one of the IDs registered in said plurality of ID registration portions in said third step.

7. The method according to claim 6, wherein said another storage portion further includes a plurality of password registration portions holding respective registered passwords, the method further comprising:
   a fourth step of requesting a password to be input on said portable information equipment, and
   a fifth step of judging whether the password is consistent with a registered password in one of said plurality of password registration portions.

8. A method of managing information while a portable information equipment is electrically connected to a storage device capable of charging a battery provided in said portable information equipment, the method comprising:
   a first step of judging whether information stored in a storage portion provided in said portable information equipment is one of updated and not updated; and
   a second step of backing up the information stored in said storage portion into another storage portion under a judgment that the information stored in the storage portion is updated in said first step.

9. The method according to claim 8, further comprising:
   a third step of judging whether the information stored in said storage portion is one of consistent with information stored in said storage device and inconsistent with information stored in said storage device under a judgment that the information stored in the storage portion is not updated in said first step; and
   a fourth step of transferring the information stored in said storage device into said storage portion under a judgment that the information stored in said storage portion is inconsistent with information stored in said storage device in said third step.

10. The method according to claim 8, further comprising a third step of judging whether an ID stored in said storage portion is consistent with an ID registered in said storage device, wherein said first step is allowed under a judgment that the ID stored in said storage portion is consistent with an ID registered in said storage device in said third step.

11. The method according to claim 8, further comprising:

a third step of requesting a password to be input on said portable information equipment, and a fourth step of judging whether the password is consistent with a registered password in said storage device, wherein said first step is allowed under a judgment that the password is consistent with the registered password in said storage device in said fourth step.

12. The method according to claim 8, wherein said storage portion includes an update bit indicating whether the information stored in said storage portion is one of updated and not updated, wherein said first step includes a step of referring to the update bit.

13. The method according to claim 8, wherein said storage device includes IDs registered in a plurality of ID registration portions holding respective IDs, the method further comprising:

a third step of judging whether an ID stored in said storage portion is consistent with at least one of the IDs registered in said plurality of ID registration portions, wherein said first step is allowed under a judgment that the ID stored in said storage portion is consistent with at least one of the IDs registered in said plurality of ID registration portions in said third step.

14. The method according to claim 13, wherein said storage device further includes a plurality of password registration portions holding respective registered passwords, the method further comprising:

a fourth step of requesting a password to be input on said portable information equipment, and a fifth step of judging whether the password is consistent with the registered password in one of said plurality of password registration portions.

* * * * *

UNITED STATES PATENT AND TRADEMARK OFFICE
CERTIFICATE OF CORRECTION

PATENT NO. : 6,832,107 B2
DATED : December 14, 2004
INVENTOR(S) : Mashiko

It is certified that error appears in the above-identified patent and that said Letters Patent is hereby corrected as shown below:

<u>Title page,</u>
Item [75], Inventor, should read:
-- [75] Inventor: Koichiro Mashiko, Tokyo (JP) --

Signed and Sealed this

Eighth Day of March, 2005

JON W. DUDAS
*Director of the United States Patent and Trademark Office*